United States Patent [19]

De Nora et al.

[11] 4,221,642

[45] Sep. 9, 1980

[54] ANIONIC MEMBRANES

[75] Inventors: Oronzio De Nora; Luigi Giuffre; Giovanni Modica, all of Milan, Italy

[73] Assignee: Oronzio deNora Impianti Elettrochimici S.p.A., Milan, Italy

[21] Appl. No.: 13,828

[22] Filed: Feb. 22, 1979

[30] Foreign Application Priority Data

Mar. 1, 1978 [IT] Italy ............................ 20792 A/78

[51] Int. Cl.$^2$ ..................... C25B 13/08; C25B 1/34
[52] U.S. Cl. ............................ 204/98; 204/128; 204/252; 204/296
[58] Field of Search .................. 204/296, 252, 59 R, 204/98, 128; 521/31

[56] References Cited

U.S. PATENT DOCUMENTS

| | | | |
|---|---|---|---|
| 2,732,351 | 1/1956 | Clarke | 204/296 |
| 2,860,097 | 11/1958 | Juda et al. | 204/296 |
| 2,970,132 | 1/1961 | Reynolds et al. | 521/31 |
| 3,247,133 | 4/1966 | Chen | 521/31 |
| 3,583,891 | 6/1971 | Hacker et al. | 204/295 |
| 3,935,086 | 1/1976 | Misumi et al. | 204/296 |
| 4,056,447 | 11/1977 | Guiffre et al. | 204/252 |

*Primary Examiner*—R. L. Andrews
*Attorney, Agent, or Firm*—Hammond & Littell, Weissenberger & Muserlian

[57] ABSTRACT

Novel membranes for electrochemical cells permeable to anions, fluid impervious and resistant to halogens and acidic and oxidizing environments comprised of copolymers of (1) divinylbenzene or halogenated vinyl monomers and (2) at least one member of the group consisting of 2-vinylpyridine and 4-vinylpyridine with the copolymers being optionally N-alkylated or N-arylated, processes for preparing the said membranes and electrochemical cells and processes using the said membranes.

12 Claims, No Drawings

ANIONIC MEMBRANES

STATE OF THE ART

Anionic membranes which are fluid impervious but selectively permeable to anions are well known and are widely used in electrochemical systems such as electrolysis cells, electrodialysis cells, batteries, etc. The known membranes are usually made of materials containing positive polar groups such as amino groups but these membranes have a limited use since they have poor resistance to halogens and especially to chlorine.

OBJECTS OF THE INVENTION

It is therefore an object of the present invention to provide novel anionic membranes with a high chemical stability, particularly to halogens and strongly acidic or alkaline and oxidizing environments.

It is another object of the present invention to provide a method for producing said novel anionic membranes.

It is further an object of the present invention to provide an electrolysis cell utilizing a novel anionic membrane of the invention and to provide a novel electrochemical process using said anionic membranes.

These and other objects and advantages will become obvious from the following detailed description.

THE INVENTION

The novel membranes of the invention are comprised of thin bodies of fluid impervious, anion permeable copolymers of (1) a member selected from the group consisting of divinylbenzene and a halogenated vinyl monomer and (2) at least one member of the group consisting of 2-vinylpyridine and 4-vinylpyridine optionally N-alkylated or N-arylated. The preferred copolymeric material are the N-alkylated or N-arylated copolymers.

Examples of suitable halogenated vinyl compounds are compounds of the formula $$X_2-C=C-X_1$$
$$\phantom{X_2-}|\phantom{=}|$$
$$\phantom{X_2-C=}Y\phantom{=}X$$

wherein Y is selected from the group comprising chlorine, fluorine, hydrogen, methyl and ethyl, and X, $X_1$, $X_2$ are individually selected from the group comprising hydrogen, fluorine and chlorine with the proviso that at least one of Y, X, $X_1$ and $X_2$ is a halogen. Examples of specific monomers are tetrafluoroethylene, chlorotrifluoroethylene, chlorofluoroethylene, vinylfluoride, vinyldenefluoride, hexafluoropropylene, etc. and mixtures thereof. Divinylbenzene has the formula

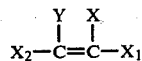

The N-alkylation or N-arylation of the vinylpyridines result in the formation of pyridine groups of the formulae

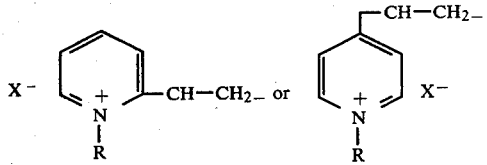

wherein X is an anion and R is selected from the group consisting of alkyl of 1 to 7 carbon atoms, cycloalkyl of 3 to 8 carbon atoms, phenylalkyl of 1 to 5 carbon atoms, the said phenyl groups being optionally substituted with at least one member of the group consisting of alkyl and alkoxy of 1 to 7 carbon atoms, halogen, and trifluoromethyl. Examples of specific R substituents are alkyl such as methyl, ethyl, propyl, isopropyl, butyl, tert.-butyl, phenethyl, benzyl, p-methyl-benzyl, p-ethyl-benzyl, etc.

The anion exchange sites of the membranes are represented by the nitrogen atom of the pyridine group which in an acidic environment as occurs in the anode compartment of a three compartment electrolysis cell undergoes protonation whereby it acquires a positive charge. The nitrogen atoms of the N-alkylated and the N-arylated polymers become pyridine cations in environments with a pH of 1 to 14 and act as the anion exchange site due to the positive charge thereon.

The membranes of the invention may be in the form of thin sheets of the copolymer or a solution of the monomers may be used to impregnate an inert, porous matrix and after evaporation of the solvent, the monomers are polymerized directly on the matrix. The amount of polymer on the matrix must be sufficiently great to confer substantial fluid-imperviousness to the resulting composite membrane and is usually at least 23% by weight of the composite membrane.

Preferably, the inert, porous matrix is asbestos paper or an asbestos mat produced by pulling a slurry of asbestos fibers through a foraminous metal electrode, but other fibrous inert materials such as polyester fibers in the form of woven or unwoven felts or cloth or woven or unwoven carbon fiber felts or woven or unwoven fabrics of polyvinylchloride, polyvinylidenechloride or polytetrafluoroethylene may be used.

When the copolymer is comprised of divinylbenzene and at least one member of the group consisting of 2-vinylpyridine and 4-vinylpyridine or their N-alkylated or N-arylated derivatives, the membranes possess outstanding physical and chemical properties due to the highly cross-linked nature of the copolymer resulting from the presence of divinylbenzene as the cross-linking agent. The resulting membranes are insoluble in the electrolysis conditions of the anolyte, infusible and resistant to halogens in highly acidic aqueous solutions under oxidizing conditions and to highly alkaline environments. They possess excellent water wettability and a high degree of anion selectivity, especially in the most preferred N-alkylated or N-arylated forms.

The molar ratio of 2- and/or 4-vinylpyridine to divinylbenzene in the polymer is 16:1 to 1:1, preferably 9:1 to 1.5:1. The degree of N-alkylation or N-arylation may be up to 100%, but it is preferably 75 to 95%.

The preferred process of the invention for the preparation of the said composite membranes comprises impregnating an inert fibrous matrix with a solution of divinylbenzene and 2- and/or 4-vinylpyridine in an organic solvent such as benzene, toluene, xylene or acetone in a molar ratio of 1:16 to 1:1, preferably 1:9 to 1:1.5, preferably containing 0.1 to 5.0 molar %; preferably about 1%, of a polymerization initiator such as dibenzoylperoxide or $\alpha\alpha'$-azobisisobutyronitrile; evaporating the organic solvent, preferably at room temperature and under reduced pressure; heating the dried impregnated matrix at 70° to 95° C. for 1 to 8 hours, preferably under an inert atmosphere such as nitrogen to effect direct polymerization of the monomers on the fiber matrix; and washing the composite material with the organic solvent to remove unreacted monomers and low molecular weight copolymer.

To form the N-alkylated or N-arylated membranes, the resulting composite membrane is treated with an organic solution of a halide of the formula RX' wherein R has the above definition and X' is chlorine, bromine or iodine, preferably bromine, in the presence of a catalyst to form the pyridinium group in its halide salt form and optionally treating the membrane with an aqueous alcoholic solution of an alkali metal hydroxide to replace the halogen with a hydroxyl ion.

The organic solvent is preferably benzene or an aliphatic hydrocarbon and the preferred catalyst is p-nitrophenol. The reaction is preferably effected at 75° to 100° C., most preferably 80° to 90° C., for 2 to 7 hours for a more complete reaction. The preferred alkali metal hydroxides are sodium hydroxide and potassium hydroxide. The resulting composite membrane is stiff, dimensionally stable, impervious to fluid flow and has a high anion selectivity.

The degree of anion selectivity may be varied by varying the amount of polymer present in the composite membrane or by varying the ratio of 2- and/or 4-vinylpyridine and divinylbenzene, preferably between 9:1 to 1.5:1 as the anion selectivity is directly proportional to the number of pyridine nitrogen atoms in the polymer. The anion selectivity may also be varied by controlling the degree of the N-alkylation or N-arylation by varying the temperature and reaction times in the reaction and by varying the substituent of the R group.

When the membrane is comprised of polymers of 2- and 4-vinylpyridine and halogenated vinyl compounds or their N-alkylated or N-arylated derivatives, the molar ratio of pyridines to halogenated vinyl monomers is 1:13 to 1:7, preferably 1:10 to 1:8. The polymers have a linear polymeric structure with a molecular weight of 10,000 to 100,000 and the membranes are water-wettable and water insoluble, have a high degree of anion selectivity and are resistant to chemical attack by halogen under the conditions in an electrochemical cell even though they are not cross-linked.

The said polymers may be used to form composite membranes as discussed above but are preferably formed into thin sheets of the polymer without a supporting matrix. The membranes may be made in the form of thin membranes without a support by conventional techniques and the usual thickness is 0.1 to 1 mm, preferably about 0.3 mm. The said membranes have a high anion selectivity on the order of 92 to 98%.

A suitable process for preparing copolymers of this latter type comprises reacting a solution of 2- and/or 4-vinylpyridine in an anhydrous organic solvent containing a small amount of a polymerization catalyst with gaseous halogenated vinyl monomer under pressure and at elevated temperatures, recovering the resulting polymer from the solvent at the end of reaction, forming the membrane by hot-pressing finely ground polymer and finally alkylating (or arylating) the membrane at the nitrogen atoms of the pyridine group.

A preferred mode of the process comprises adding the gaseous halogenated vinyl monomer to an autoclave previously flushed with nitrogen and containing a solution of 2- and/or 4-vinylpyridine and 1 to 2 mole % of $\alpha,\alpha'$-azobisisobutyronitrile in anhydrous acetone until a pressure of 4 to 5 atmospheres is reached; heating the resulting mass to 70° to 85° C. until the falling pressure becomes constant, usually about one atmosphere after 4 to 5 hours; evaporating the acetone to recover the polymer; grinding the polymer to a fine size and hot pressing the ground polymer at 200 to 300° C., preferably 275° C., to form the thin fluid impervious membrane.

To form the N-alkylated or N-arylated derivatives thereof, the said membrane may be treated with an organic solution of RX' wherein R and X' have the above definitions containing a small amount of catalyst for a time sufficient to form the pyridinium groups and optionally treating the membrane with an aqueous alcoholic solution of an alkali metal hydroxide to replace the halide ion with hydroxyl ion.

The preferred halogen of X' is bromine and the solvent is preferably benzene or an aliphatic hydrocarbon. The preferred catalyst is p-nitrophenol. The reaction temperature is 75° to 100° C., preferably 80° to 90° C., for 2 to 7 hours. The preferred alkali metal hydroxide is sodium hydroxide or potassium hydroxide.

As a modification of the process, the polymer may be treated with the organic solution of RX' before being formed into the thin sheets and the resulting N-alkylated or N-arylated polymer may be ground and hot pressed into thin sheets. In any event, the anionic membrane is fluid impervious and the anion selectivity may be varied by the ratio of the monomers or varying the degree of N-alkylation or N-arylation and the reaction conditions or by the selection of the R group.

The polymers of the membrane may contain up to 40%, preferably 30 to 40% of one or more other polymerizable monomers such as vinylacetate, methyl methacrylate and preferably styrene.

The composite membranes of the invention are particularly useful in the electrolysis of alkali metal halide brines to produce the halogen and the alkali metal hydroxide such as chlorine and caustic soda but may also be used in other electrolysis reactions.

The novel electrolytic process of the invention for the preparation of a chemical product comprises providing an electrolyte containing the elements of the product to be produced in an electrolytic cell with an anode and a cathode separated by an anion permeable, fluid impervious membrane of the invention, passing an electrolysis current through the anode, cathode and electrolyte and recovering said chemical product from the said cell.

The novel electrolytic cell of the invention comprises a cell housing containing at least one anode and at least one cathode forming an interelectrodic gap with an anion selective, fluid impervious membrane of the invention separating the anode and cathode.

In the following examples there are described several preferred embodiments to illustrate the invention. However, it should be understood that the invention is not intended to be limited to the specific embodiments.

EXAMPLE 1

A series of asbestos papers, 0.025" L/FX 36" type, manufactured by Johns-Mansville, of varying weights were impregnated with a benzene solution containing 25 to 50% by volume of 4-vinylpyridine (4VP) and divinylbenzene (DVB) in a molar ratio of 9/1 to 1.5/1 with 1 molar % of dibenzoylperoxide also present as a polymerization initiator. The solvent was evaporated at room temperature and the impregnated papers were heated at 80° C. in a closed reactor under nitrogen for 4 to 8 hours. The resulting copolymeric composite sheets were washed with benzene to remove the low molecular weight copolymers and the unreacted monomers and then were treated at 90° C. with a benzene solution of n-butyl bromide containing 1.5% by moles, with respect to the alkyl halide, of p-nitrophenol as catalyst for four hours. Then, the membranes thus obtained were washed with benzene and treated with an aqueous alcoholic solution of 5% sodium hydroxide to replace the bromide ions with hydroxyl ions.

The membranes were then placed between an anode and a cathode in an electrochemical cell to divide the same into an anodic and a cathodic compartment, and a titrated potassium hydroxide solution was added to said compartments. The solution was subjected to electrolysis and modifications of the potassium hydroxide concentration in said compartments, compared with the initial concentration, are reported in Table I in terms of anionic selectivity. $\Delta P$ is the weight increase and %$\Delta P$ is the percentage weight increase with respect to the final weight.

TABLE I

| Sample | Molar Ratio 4VP/DVB | Solution Strength (% vol.) | Asb. Sheet Initial Weight (g) | Composite Final Weight (g) | $\Delta P$ (g) | % $\Delta P$ (g) | Ionic Selectivity |
|---|---|---|---|---|---|---|---|
| 1 | 9:1 | 25 | 8.82 | 9.92 | 1.1 | 11 | — |
| 2 | 9:1 | 35 | 9.41 | 11.74 | 2.33 | 19.8 | — |
| 3 | 1.5:1 | 25 | 9.46 | 10.51 | 1.05 | 10 | — |
| 4 | 9:1 | 50 | 9.41 | 13.26 | 3.85 | 29 | 89 |
| 5 | 9:1 | 35 | 9.46 | 12.43 | 2.97 | 23.9 | 75 |
| 6 | 1.5:1 | 35 | 9.46 | 12.33 | 2.87 | 23.2 | 35 |
| 7 | 1.5:1 | 50 | 9.14 | 12.38 | 3.24 | 26 | 88 |
| 8 | 1.5:1 | 50 | 9.48 | 12.69 | 3.21 | 25 | 87 |

The resulting anionic membranes were stiff and dimensionally stable even after prolonged exposure to potassium hydroxide solution. It is clear from Table I that an increase of copolymer load over a value of about 23.2 to 25% (with respect to the final weight of the membrane) yields composite materials substantially impervious to fluids and possessing an increasing anionic selectivity as the amount of copolymer increases. The ionic selectivity of the membrane may be varied, independent of the amount of copolymer, for instance by varying the molar ratio of 4-vinylpyridine in a range from 9/1 to 1.5/1 (for comparison see samples 5 and 6).

EXAMPLE 2

9.4 g of asbestos paper, 0.025" L/FX 36" type, manufactured by Johns-Mansville were soaked with a benzene solution containing 45% by volume of 2-vinylpyridine and divinylbenzene, in a 8/1 molar ratio, and 1% mole of $\alpha$-$\alpha'$ azobisisobutyronitrile as a copolymerization initiator. After evaporating the benzene at room temperature under vacuum, the impregnated paper was placed in a closed reactor under nitrogen and kept therein at 85° C. for 4 hours to obtain a copolymeric composite membrane which was washed with benzene and dried. Then it was weighed and comparison of the final weight of 13.2 g with the initial weight showed a polymer content of 28.8%.

A three-compartment electrolytic cell was provided with a titanium based anode with an electrocatalytic coating of ruthenium dioxide immersed in the anolyte and with a low carbon steel cathode immersed in the catholyte. A cationic membrane Nafion 315, manufactured by DuPont de Nemours, separated the cathode chamber and the middle chamber and the anionic membrane of the present example separated the anodic chamber and the middle chamber. Brine containing 310 g/l of sodium chloride was circulated at 80° C. in the middle chamber and electrolysis was effected at a current density of 1000 A/m$^2$, a cell voltage of 4.7 V and a sodium hydroxide concentration of 160 g/l. The average faraday efficiency ranged between 85 and 94%. After 10 days of continuous operation, examination of the membrane showed no changes therein.

EXAMPLE 3

A solution of 3.2 ml of 4-vinylpyridine and 2 g of $\alpha,\alpha'$-azobisisobutyronitrile in 200 ml of anhydrous acetone was added to a 500 ml glass auto clave equipped with a stirrer and a circulating water heating sleeve connected to a thermostat. The auto clave was flushed with nitrogen to remove oxygen and then was placed under a vacuum. Chlorotrifluoroethylene was bubbled through a sodium hydroxide solution to remove any residual hydrofluoric acid traces and was then added to the auto clave until the pressure reached 4 atmospheres at a temperature of 17° C. The auto clave was heated at 75° C. with stirring for four hours during which the pressure fell to one atmosphere. Acetone was then evaporated to leave a residue of 9 g of a copolymer with a 1:9 ratio of 4-vinylpyridine to chlorotrifluoroethylene.

The copolymer was ground to a powder with a 200 to 350 mesh grain size and the powder was pressed at 275° C. to form a 0.3 mm thick film of the copolymer. The resulting film was placed in a reactor and contacted with a benzene solution of 30% by volume of n-propyl bromide containing 1 molar % of p-nitrophenol. The reaction was carried out at 85° C. for five hours. The resulting anionic membrane, wherein N-propylpyridinium groups were present in their bromide salt form, was then treated with an aqueous alcohol solution of 7% sodium hydroxide for a time sufficient to replace the bromide anions with hydroxyl anions. Finally, the anionic membrane in its hydroxylated form was tested in the same cell as described in Example 1, wherein a similar potassium hydroxide titrated solution was electrolyzed. After two weeks of continuous operation, the membrane was practically unchanged and was still working with an anion selectivity of 91–95%.

Various modifications of the products and processes of the invention may be made without departing from the spirit or scope thereof and it should be understood that the invention is intended to be limited only as defined in the appended claims.

We claim:

1. An anion permeable, fluid impervious membrane comprising thin bodies of fluid impervious, anion permeable copolymers of (1) a halogenated vinyl monomer and (2) at least one member of the group consisting of 2-vinylpyridine and 4-vinylpyridine optionally N-alkylated or N-arylated.

2. The membrane of claim 1 wherein the polymer is 2- and/or 4-vinylpyridine and a halogenated vinyl monomer in a molar ratio of 1:13 to 1:7.

3. The membrane of claim 2 wherein the ratio is 1:10 to 1:8.

4. The membrane of claim 2 wherein the halogenated vinyl monomer is selected from the group consisting of tetrafluoroethylene, chlorotrifluoroethylene, vinyl fluoride, hexafluoropropylene and vinylidenefluoride.

5. The membrane of claim 1 wherein the pyridine groups of the polymer are substituted at the nitrogen atom with a member of the group consisting of alkyl of 1 to 7 carbon atoms, cycloalkyl of 3 to 8 carbon atoms, phenylalkyl of 1 to 5 carbon atoms, the said phenyl groups being optionally substituted with at least one member of the group consisting of alkyl and alkoxy of 1 to 7 carbon atoms, halogen and trifluoromethyl.

6. A membrane of claim 1 wherein the halogenated vinyl monomer has the formula

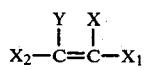

wherein Y is selected from the group comprising chlorine, fluorine, hydrogen, methyl and ethyl, and X, $X_1$, $X_2$ are individually selected from the group comprising hydrogen, fluorine and chlorine with the proviso that at least one of Y, X, $X_1$ and $X_2$ is a halogen.

7. An electrolysis cell comprising a housing containing at least one anode and at least one cathode and an anion permeable membrane of claim 3.

8. An electrolytic process for the preparation of a chemical product comprising providing an electrolyte containing the elements of the product to be produced on an electrolytic cell with an anode and a cathode separated by a membrane of claim 3, passing an electrolysis current through the anode, cathode and electrolyte and recovering the said chemical product.

9. An electrolysis cell comprising a housing containing at least one anode and at least one cathode and an anion permeable membrane of claim 1.

10. The cell of claim 9 wherein the polymer is 2- and/or 4-vinylpyridine and a halogenated vinyl monomer in a molar ratio of 1:13 to 1:7.

11. The cell of claim 10 wherein the ratio is 1:10 to 1:8.

12. An electrolytic process for the preparation of a chemical product comprising providing an electrolyte containing the elements of the product to be produced on an electrolytic cell with an anode and a cathode separated by a membrane of claim 1, passing an electrolysis current through the anode, cathode and electrolyte and recovering the said chemical product.

* * * * *